United States Patent
Davison et al.

(10) Patent No.: US 9,698,632 B2
(45) Date of Patent: Jul. 4, 2017

(54) WIRELESS BATTERY CHARGER AND CHARGE-RECEIVING DEVICE

(71) Applicant: Otter Products, LLC, Fort Collins, CO (US)

(72) Inventors: Thomas J. Davison, Fort Collins, CO (US); James C. Larsen, Bothell, WA (US)

(73) Assignee: Otter Products, LLC, Fort Collins, CO (US)

( * ) Notice: Subject to any disclaimer, the term of this patent is extended or adjusted under 35 U.S.C. 154(b) by 204 days.

(21) Appl. No.: 14/709,350

(22) Filed: May 11, 2015

(65) Prior Publication Data

US 2015/0326061 A1    Nov. 12, 2015

Related U.S. Application Data

(60) Provisional application No. 61/991,279, filed on May 9, 2014.

(51) Int. Cl.
*H02J 7/00* (2006.01)
*H02J 50/60* (2016.01)
(Continued)

(52) U.S. Cl.
CPC .............. *H02J 50/60* (2016.02); *H02J 7/007* (2013.01); *H02J 7/0044* (2013.01); *H02J 7/025* (2013.01); *H02J 50/10* (2016.02); *H02J 50/80* (2016.02)

(58) Field of Classification Search
CPC .. H02J 50/10; H02J 50/60; H02J 50/80; H02J 7/0044; H02J 7/007; H02J 7/025
See application file for complete search history.

(56) References Cited

U.S. PATENT DOCUMENTS 7,728,551 B2    6/2010    Reed et al.
7,868,585 B2    1/2011    Sarnowsky et al.
(Continued)

FOREIGN PATENT DOCUMENTS

CN    103171477 A    6/2013
WO    2012176206 A2    12/2012
WO    2013080068 A1    6/2013

OTHER PUBLICATIONS

Branscombe, "The future of Wireless Power: 2. Taking Wireless Power Further", Tom's Guide, Mar. 28, 2011, <http://www.tomsguide.com/us/Wireless-Power-Tesla-Fulton-eCoupled,review-1641-2.html>, last accessed Jun. 11, 2015.
(Continued)

*Primary Examiner* — Vuthe Siek

(57) ABSTRACT

A wireless charger includes a plurality of conductive coils and electronic circuitry. The coils are disposed around a perimeter and face a generally central area of the perimeter. The coils are connected to and controlled by the electronic circuitry, which includes an electric power receiving circuit and a coil controller. The electric power receiving circuit receives electrical power from an external source and conditions the power for provision to the coil controller. The coil controller controls provision of an oscillating current to select coils within the plurality of coils. A protective enclosure or portable electronic device may have receiving coils disposed at its sides for corresponding to at least two of the conductive coils of the wireless charger.

12 Claims, 10 Drawing Sheets

(51) Int. Cl.
*H02J 7/02* (2016.01)
*H02J 50/10* (2016.01)
*H02J 50/80* (2016.01)

(56) References Cited

U.S. PATENT DOCUMENTS

| | | | |
|---|---|---|---|
| 8,310,200 B2 | 11/2012 | Matouka et al. | |
| 8,541,974 B2 | 9/2013 | Farahani | |
| 9,153,109 B1 | 10/2015 | Foster et al. | |
| 2005/0188203 A1 | 8/2005 | Bhaskaran et al. | |
| 2006/0261777 A1 | 11/2006 | Li et al. | |
| 2007/0052600 A1 | 3/2007 | Kamitani et al. | |
| 2008/0164855 A1 | 7/2008 | Tam et al. | |
| 2008/0315826 A1 | 12/2008 | Alberth, Jr. et al. | |
| 2009/0051223 A1 | 2/2009 | Woo | |
| 2009/0066529 A1 | 3/2009 | Fukada | |
| 2009/0322158 A1* | 12/2009 | Stevens | H02J 5/005 |
| | | | 307/104 |
| 2010/0003950 A1 | 1/2010 | Ray et al. | |
| 2010/0171234 A1 | 7/2010 | Lee et al. | |
| 2011/0050164 A1* | 3/2011 | Partovi | H01F 5/003 |
| | | | 320/108 |
| 2012/0019057 A9 | 1/2012 | Kirby et al. | |
| 2012/0088558 A1 | 4/2012 | Song | |
| 2012/0091950 A1 | 4/2012 | Campanella et al. | |
| 2012/0112691 A1 | 5/2012 | Kurs et al. | |
| 2012/0303520 A1 | 11/2012 | Huang | |
| 2012/0316811 A1 | 12/2012 | Choi et al. | |
| 2012/0319487 A1 | 12/2012 | Shah | |
| 2013/0038279 A1 | 2/2013 | Seyerle et al. | |
| 2013/0069583 A1 | 3/2013 | Lemelman et al. | |
| 2013/0234481 A1 | 9/2013 | Johnson | |
| 2014/0117921 A1 | 5/2014 | Suomela | |
| 2014/0210406 A1* | 7/2014 | Na | H02J 7/025 |
| | | | 320/108 |
| 2014/0217965 A1* | 8/2014 | Van Wiemeersch | H02J 7/0042 |
| | | | 320/108 |
| 2015/0111626 A1 | 4/2015 | Bell | |
| 2015/0364938 A1 | 12/2015 | Lapetina et al. | |
| 2016/0211702 A1* | 7/2016 | Muratov | H01F 38/14 |
| 2016/0261133 A1 | 9/2016 | Wang | |

OTHER PUBLICATIONS

Capdase CA00-C201 "PowerCup 2.2" Car Cup Holder Charger, available Dec. 2012, <http://www.amazon.in/Capdase-CA00-C201-Car-Mount-Holder/dp/B004OC5K1E> last accessed Jun. 11, 2015.

Haselton, "GM to Add Gadget Wireless Charging Feature to Cars in 2014", TechnoBuffalo.com, Aug. 24, 2014, <http://www.technobuffalo.com/2013/08/24/gm-wireless-charging-cars/>, last accessed Jun. 11, 2015.

Kurs et al., "Wireless Power Transfer via Strongly Coupled Magnetic Resonances", Science, Jul. 6, 2007, pp. 83-86, vol. 317.

Kuyvenhoven et al., "Development of a Foreign Object Detection and Analysis Method for Wireless Power Systems", 2011 IEEE Symposium on Product Compliance Engineering (PSES) Oct. 10, 2011-Oct. 12, 2011, San Diego, CA., pp. 1-6.

OGG, "Wireless Power Gets Recharged", CNET Wireless Power, Jan. 5, 2007, <http://news.cnet.com/Wireless-power-gets-recharged/2100-1041_3-6147684.html> last accessed Jun. 11, 2015.

Sengupta et al., "Universally Compatible Wireless Power Using the Qi Protocol", Low Power Design, 2011, pp. 1-6, <http://lowpowerdesign.conn/article_Tl-Qi.html> last accessed Apr. 11, 2014.

* cited by examiner

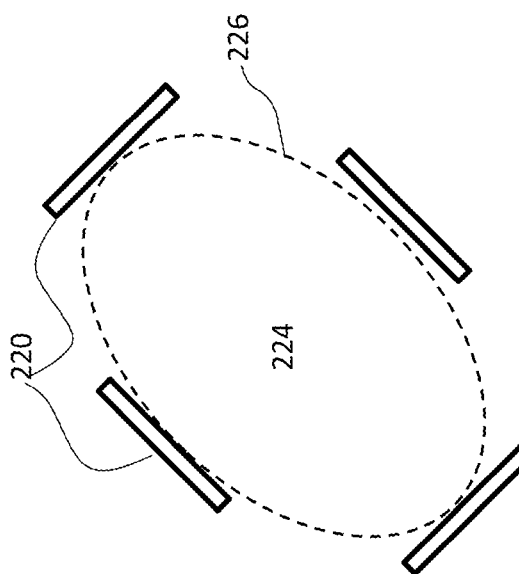
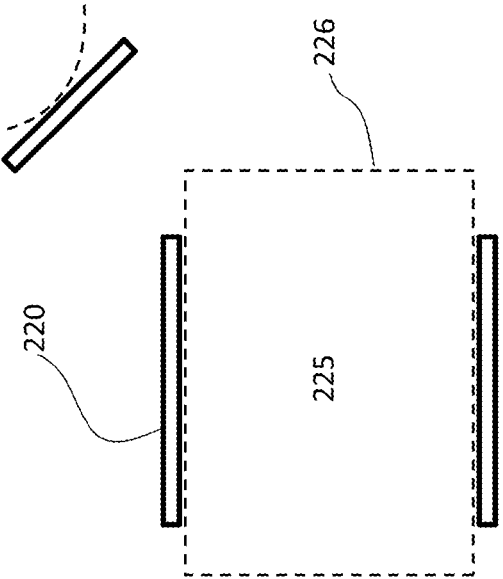
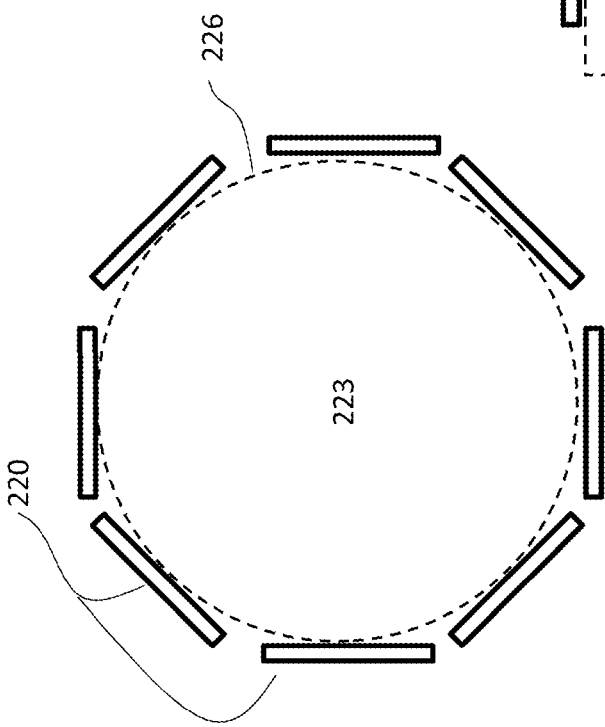
FIG. 2A
FIG. 2B
FIG. 2C

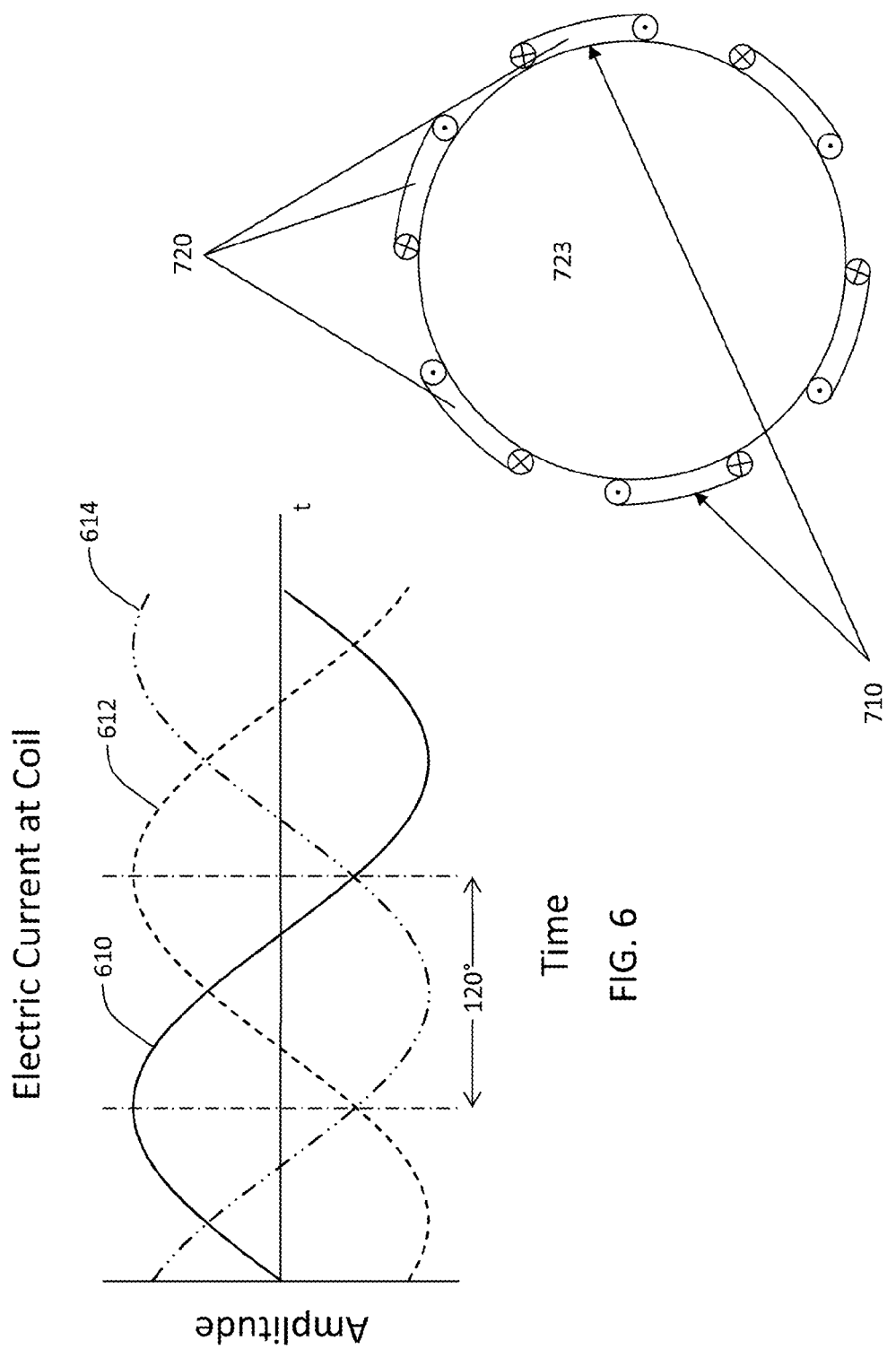

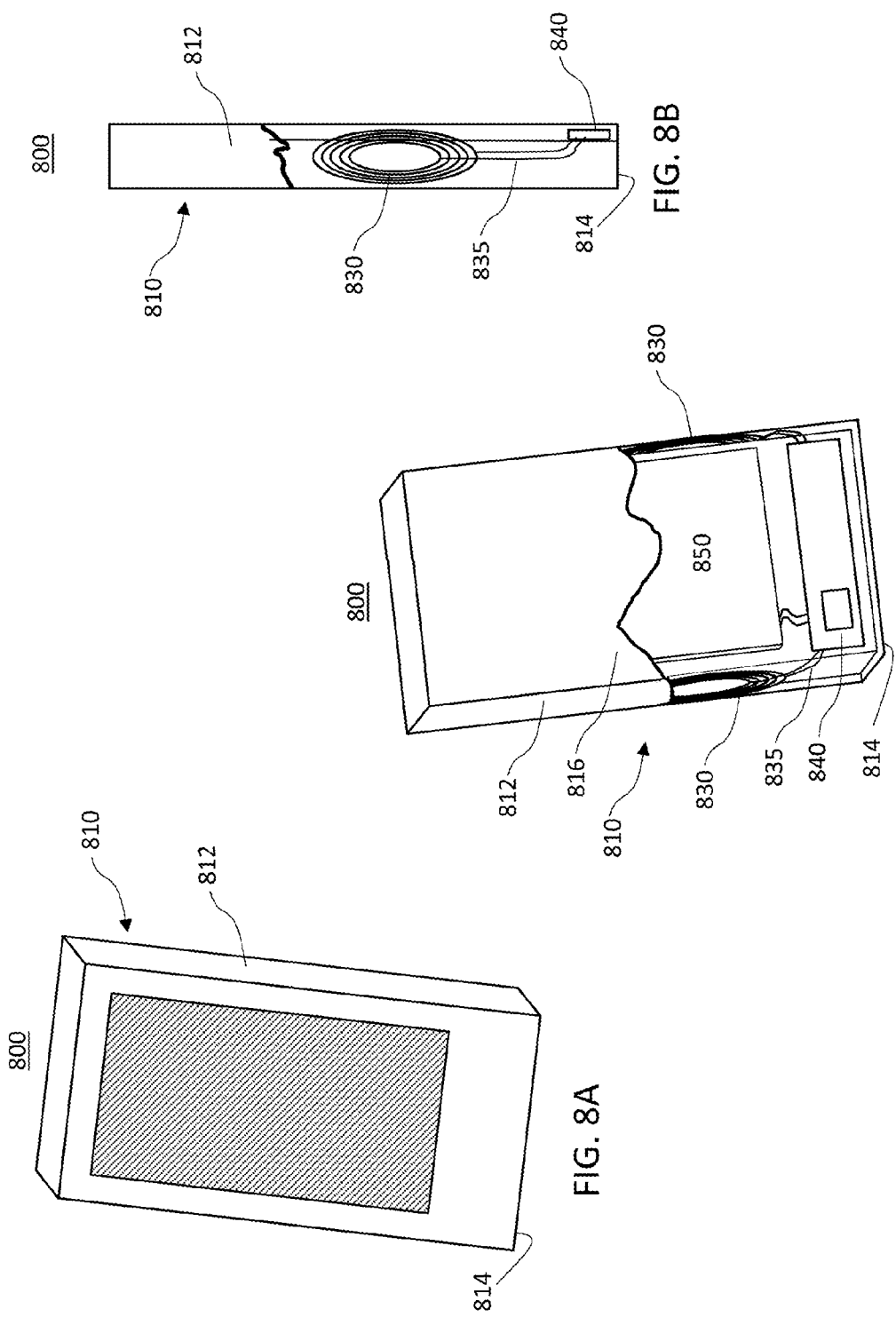

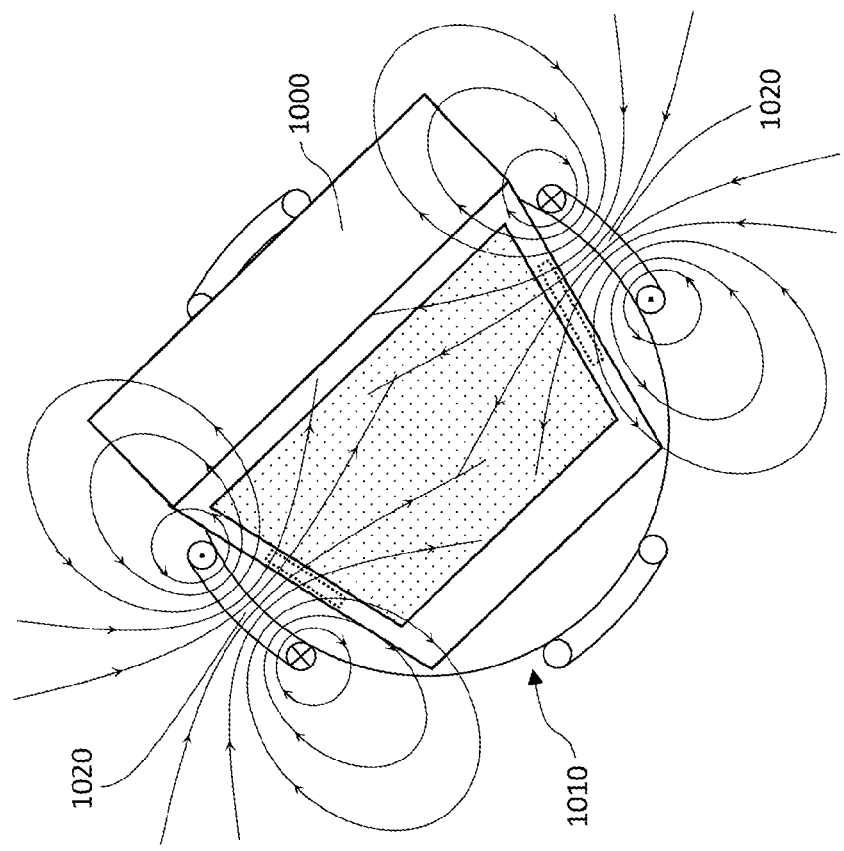
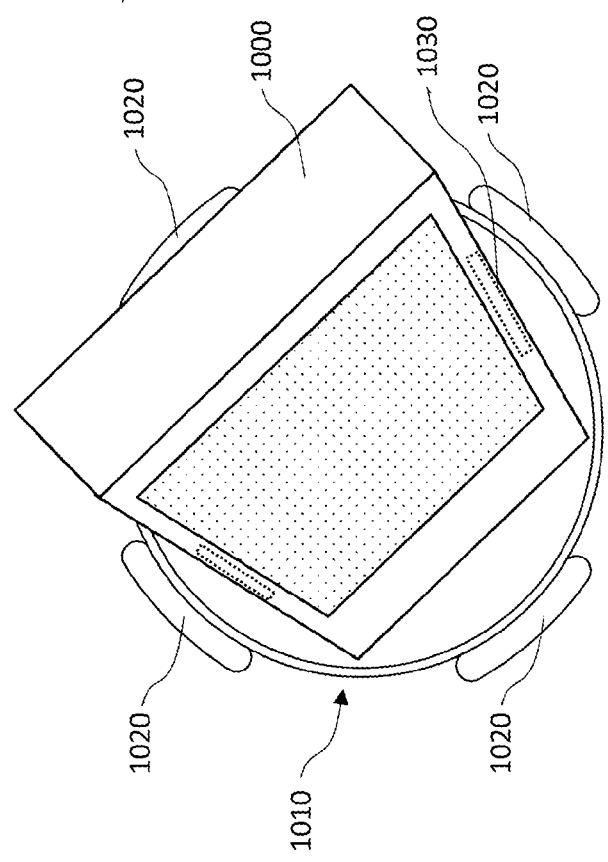
FIG. 10B
FIG. 10A

WIRELESS BATTERY CHARGER AND CHARGE-RECEIVING DEVICE

CROSS-REFERENCE TO RELATED APPLICATIONS

This application claims the benefit of U.S. Provisional Patent Application Ser. No. 61/991,279; filed May 9, 2014; which is hereby incorporated by reference in its entirety.

BACKGROUND

Portable electronic devices generally require power to operate. The electrical power is often supplied at least partly by one or more batteries. When power in the battery is depleted, a user may replace the battery or recharge it. Recharging the battery often involves physically attaching the battery or the portable electronic device to a power source, such as a standard electrical outlet, via a power cable.

An electrical battery typically includes one or more electrochemical cells that convert stored chemical energy into electrical energy. When the battery is attached to a load (e.g., an electric circuit such as found in a mobile phone), elements within the battery are changed due to a chemical reaction within the battery in order to allow ions (atoms having a positive or negative charge) to move between the battery's positive and negative terminals. This movement of ions permits electrical current to flow out of the battery for use by an electrical device. However, a limited amount of ions is available for moving from one terminal to another, and over time the chemical arrangement within the battery changes such that the ions are depleted. In disposable batteries this chemical rearrangement is permanent. However, in a rechargeable battery, the original chemical arrangement within the battery can be restored by applying a reverse electrical current, thereby restoring ions to a position for generating electrical current. Thus, a battery charger provides the reverse current needed for restoring a battery's charge.

In wired charging devices, the electrical current needed to restore the battery's charge is provided from a wired source, such as a home electrical outlet. For example, a typical charger for an electronic device may include a wall plug, a wire attached at one end to the wall plug, and an electrical connector attached to the other end of the wire. When the wired charger is connected to both the wall outlet and the electronic device, electrical current from the home electrical outlet is supplied through the wire to the electronic device's circuitry, which may directly or indirectly provide the current to a battery attached to the electronic device.

Some electronic devices may include circuitry directed to charging or recharging a battery using wireless power transfer. This technology is especially useful in instances where use of wires may be hazardous, impossible, or simply inconvenient. For example, mobile phones may incorporate wireless power receiving circuitry that can receive power wirelessly from a wireless charging station. Wireless charging stations are available for conveniently charging phones so equipped, reducing the need to attach a power cable to the phone.

In wireless power transfer, power is transferred via electromagnetic fields instead of by the wire used in normal wired power transfer. Such electromagnetic field may operate through air, water, and many other materials. According to electromagnetic principles, a time-varying electrical current in an electrical conductor creates a time-varying magnetic field around the electrical conductor. The magnetic field is strongest near the electrical conductor, and decreases in strength with distance from the electrical conductor. This electromagnetic principle may also operate in reverse. That is, a time-varying magnetic field can induce a time-varying current in an electrical conductor. For example, if an electrically conductive wire passes a permanent magnet, a current is induced in the wire.

In a typical wireless transfer system, a wireless power source provides a time-varying current to an electrically conductive element, often an antenna formed from a coil of wire. That time-varying current generates a time-varying magnetic field around the coil of the power source. A wireless power receiver may also include a conductive element, also typically a coil antenna. If the source coil and receiving coil are sufficiently close together, the time-varying magnetic field around the source coil induces a time-varying electrical current in the receiving coil. This induced electrical current may be used to charge a battery attached to the wireless power receiver.

In a variation of inductive wireless power transfer called "magnetic resonance," the electrical conductors of the source and receiver are tuned to resonate at a predetermined frequency. A "resonant circuit" permits greater efficiency of energy transfer in many kinds of systems. The reader may be familiar with resonance in an audio setting. In a shower stall, for example, a particular hummed or sung pitch (frequency) may sound louder (higher amplitude) than other pitches hummed or sung with the same energy. The louder pitch is one for which characteristics of the shower stall provide resonance.

Resonance occurs when a system is able to store and easily transfer energy between two or more different storage modes. In the shower example, the shower construction (system) is able to store the hummed/sung pitch (audio energy) in the physical construction of the walls and in the volume of air within the shower. At the resonant frequency this energy is easily transferred between vibrations (oscillations) of the walls and vibrations (oscillations) in the volume of air. Changes in the characteristics (e.g., dimensions or materials) of the shower could change the pitch (frequency) at which the resonance occurs, or could prevent resonance altogether. Because of resonance, the resonant frequency reflected from the shower walls fades much more slowly than non-resonant frequencies Using the principles of a resonant system, a wireless power transfer system can achieve higher power-transfer efficiency compared to non-resonant inductive charging. This increase in efficiency can permit power transfer over a greater distance compared with normal (non-resonant) inductive charging, and/or may permit faster charging due to comparatively higher amount of power received by a receiving device. The greater distance and efficiency may also permit less precise alignment of source and receiving antennas than is necessary in non-resonant inductive charging systems.

Several standards for wireless power transfer exist or are under development and are competing for dominance in the industry. The Wireless Power Consortium provides the QI™ (pronounced "chee") standard, and the Power Matters Alliance is developing the PMA™ standard. These proposed standards independently describe primarily inductive power transfer systems and protocols. Both groups are developing magnetic resonance wireless power transfer protocols, although their established bases currently include only inductive power transfer. Alliance for Wireless Power's scheme (A4WP®) presents another competing wireless power transfer scheme focused chiefly on magnetic resonance power transfer at a higher frequency.

In general, in both the inductive and the magnetic resonant power transfer schemes a changing electric current is provided to an electrically conductive source coil. The changing electric current generates a changing magnetic field around the coil, and the strength of the magnetic field corresponds to the strength of the changing electric current in accord with electromagnetic principles. The magnetic field weakens with distance from the source coil. Based on electromagnetic coupling principles, a receiving coil within range reacts to the generated magnetic field, inducing a changing electromotive force (EMF) in the receiving coil. When a load is connected to the receiving coil, the EMF is converted to an electric current that may be used to power a device or charge a battery, for example.

Each of the three main competing wireless power systems includes a data communication channel in addition to the power transfer channel described above. The QI and PMA systems include single-direction communication—from power receiving device to power transmitter—typically using data modulation on the power carrier frequency. For instance, a receiving device may employ "backscatter modulation" in which the amount of power drawn by a perceived load of the receiving device is modulated according to a communication protocol. The receiving coil's change in power draw affects the magnetic coupling between the source coil and receiving coil, and is thus detectable at the power transmitting device. A4WP instead provides two-way wireless data communication between power transmitter and power receive over a separate communications channel (e.g., using BLUETOOTH low energy, a.k.a. BLUETOOTH SMART).

A chief difference between the magnetic resonant and inductive power transfer schemes, as applied in conventional devices, is in the distance between primary and secondary coils permissible for efficient power transfer, and in a corresponding need for precision of alignment needed between the primary and secondary coils. Inductive wireless charging uses low frequency near-field electromagnetic coupling between a primary (or source) antenna and a secondary (or receiving) antenna. Due to limitations of low-frequency, near-field inductive coupling, the distance between the primary and secondary antennas is generally on the order of a few millimeters, and a substantially precise alignment is required between the source and receiving antennas. Magnetic resonance power transfer uses a higher frequency which permits a coil distance of at least four times the diameter of the coil, and need not be so precise in alignment. The power transfer efficiency is substantially lower, however, particularly as distance increases.

Conventional wireless power transfer chargers for portable electronic devices, such as mobile phones, portable meters, media players, tablet computers, notebook computers and the like, have generally been limited to flat-surface formats. That is, the device to be charged is laid on a flat charging platform or mat. In some instances, the charging platform is elevated at an angle and provided with a mating system, such as an array of magnets, to provide a desk-user friendly mount for the device. However, in each instance the flat-surface wireless power transfer charger, particularly in inductive charging implementations, requires the precise placement of the device to be charged, and does not accommodate orientations of the device to be charged other than one in which a main surface of the charging device is substantially parallel to the charger surface.

SUMMARY OF THE DISCLOSURE

Cupholder based wireless charging devices described in the art include either a planar surface on which a receiving device is placed, or a single charging coil permanently (or semi-permanently) oriented within the cupholder to be parallel with a chief surface of a typical device to be charged. (See U.S. Pat. No. 8,541,974; U.S. Pat. No. 8,310,200.) However, such wireless chargers do not permit multiple orientations of a chargeable device. Wireless chargers disclosed herein provide a solution to this problem.

Similarly, portable electronic devices are susceptible to dropping, scratching, crushing, and other damage. In accord with this disclosure, a protective enclosure for a portable electronic device may serve to protect the electronic device from such damage while also providing additional electronic features. For example, a protective enclosure for a portable electronic device may provide electronic features not available in the device itself, such wireless power features by which the protective enclosure can capture energy from a time-varying magnetic field generated from one or more wireless charging coils in a wireless charger. In some implementations the protective enclosure may include a battery.

When its user is in a vehicle, a mobile device may commonly be placed in the vehicle's cupholder. Typically, different users may place the mobile device in the cupholder in any of an infinite number of orientations. For example, a vehicle driver may place a mobile device in the cupholder in an orientation convenient for readability or easy access from the driver seat, or may casually dump the mobile device in the cupholder without regard to its orientation. A passenger may wish to use the same cupholder to charge a second device, in addition to the driver's device. If the passenger is the sole user of the cupholder for charging purposes, the device orientation may be different from the orientation the driver would use. Where prior cupholder based wireless chargers may fail to address a plurality of portable device orientations, the present disclosure presents a wireless charger for a portable electronic device in which a user's portable electronic device could, automatically, be wirelessly while in a variety of orientations, thus prolonging the use time of the device with minimum inconvenience to the device user.

In a disclosed implementation, a wireless charging apparatus for charging a battery of a portable electronic device may include a plurality of electrically conductive coils and electronic circuitry. The conductive coils may each form a portion of a perimeter around a receiving area. The receiving area is arranged to receive the portable electronic device, and each conductive coil may have a central axis around which the respective conductive coil is formed. The central axis of each conductive coil may be directed inward from the perimeter such that each coil faces substantially inward. Each conductive coil in the plurality of conductive coils may include at least one loop of electrically conductive material, and the ends of each conductive coil may constitute electrical leads. The electronic circuitry includes an electric power receiving circuit and a coil controller. The electric power receiving circuit may be arranged or programmed to receive electrical power and to provide at least a portion of the electrical power to the coil controller. The coil controller may be electrically connected to the electric power receiving circuit and to the electrical leads of the conductive coils. The controller may include components arranged or programmed to selectively provide a changing electric current to at least one of the conductive coils, where the changing electric current induces a magnetic field around the respective conductive coil that is selected for receiving the changing electrical current.

A mounting apparatus for a portable electronic device may include a gripping device and electronic circuitry. The gripping device may include at least a first side-engaging portion and a second side engaging portion. The first and second side-engaging portions may be disposed generally opposite each other and may be formed to engage sides of the portable electronic device. Each side-engaging portion may respectively include at least one electrically conductive coil, where each electrically conductive coil may have at least one electrical lead for electrically connecting the coil. The electronic circuitry may include an electric power receiving circuit and a coil controller. The electric power receiving circuit may be arranged or programmed to receive electrical power and to provide at least a portion of the electrical power to the coil controller. The coil controller may be electrically connected to the electric power receiving circuit and to the electrical leads of the electrically conductive coils. The controller may be arranged or programmed to provide a changing electric current to at least each of the electrically conductive coils in the gripping device, where the changing electric current may induce a magnetic field around the electrically conductive coil.

In another aspect of the disclosure, a protective enclosure for a portable electronic device may include a hard shell. The hard shell may include a substantially planar portion that may receive a back of the portable electronic device. The substantially planar portion may house power-receiving circuitry. The hard shell may also include side walls extending from each of two opposing side edges of the substantially planar portion. The side walls each may include a respective power-receipt coil. The power-receipt coil may be arranged for corresponding to one or more charging coils provided in a charging apparatus, and each power-receipt coil may include leads connected to the power-receiving circuitry. The protective case may also include an internal connector connected at a bottom wall of the hard shell, and the internal connector may be disposed to interface with an electrical connector of the portable electronic device. In response to an oscillating magnetic field at a predetermined frequency, an electric current may be induced in the power-receipt coils. The power-receiving circuitry may process the electric current for use by at least one of the protective enclosure and the portable electronic device.

While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTIONS OF DRAWINGS

In the drawings,

FIGS. 2A-2C illustrate embodiments of wireless charger including source antennas disposed around charging areas of different perimeter geometries;

FIG. 6 is a graph showing three phases of electric current in a disclosed three-phase wireless charger system;

FIG. 7 is a top cross-sectional view of a wireless charger having six source antennas dispersed around a circular charging area;

FIG. 8A is a top-front perspective view of a device to be charged;

FIG. 8B is a side cutaway view of a device to be charged, where a portion of the outermost shell or housing of the device to be charged is cut away to expose a side-disposed receiving antenna and receiving antenna leads;

FIG. 8C is a cutaway, top-rear perspective view of a protective case having disclosed wireless charging circuitry;

FIGS. 10A and 10B illustrate a top view of a cupholder having a wireless charger together with a device to be charged disposed therein;

DETAILED DESCRIPTION

The detailed description set forth below in connection with the appended drawings is intended as a description of exemplary embodiments of the present disclosure and is not intended to represent the only embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the disclosure. It will be apparent to those skilled in the art that the exemplary embodiments of the disclosure may be practiced without these specific details. In some instances, well-known structures and devices are shown in block diagram form in order to avoid obscuring the novelty of the exemplary embodiments presented herein.

In one application, for the convenience and safety of vehicle drivers a vehicle may incorporate a wireless charging station into an area of the vehicle for convenience of a driver or passenger in charging her mobile phone or other wirelessly chargeable device. A vehicle-based phone charger incorporating wireless power transfer may require less time and attention to use than a wired charging device, and may thus reduce the driver's distraction and increase driver's safety.

Figure 1:
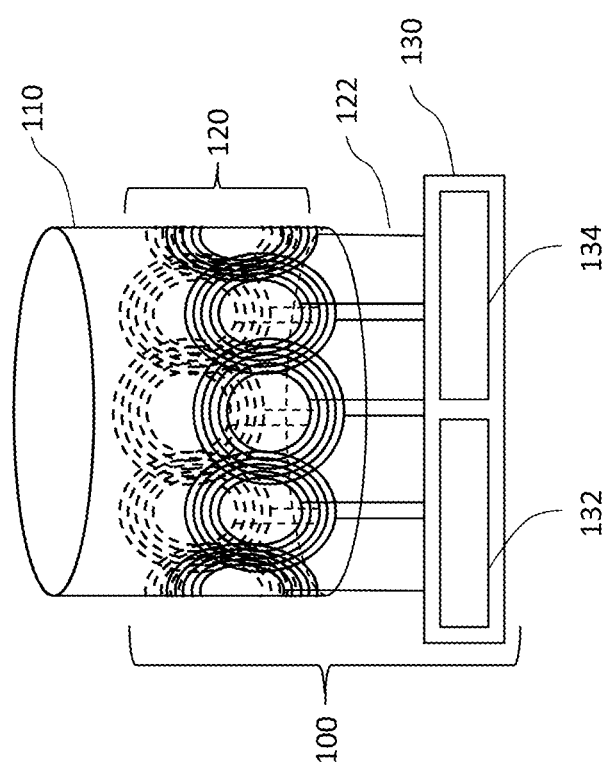
FIG. 1 shows a top perspective view of a disclosed wireless charger applied in a vehicle cupholder.

FIG. 1 shows a top perspective view of a disclosed wireless charger 100 applied in a cupholder 110, for example a cupholder in a vehicle. The wireless charger may include several source antennas 120, attached by leads 122 to electronic circuitry 130. The electronic circuitry 130 may include one or more antenna controllers 132 and a power receiving circuit 134 that may receive power from an external power source, each of which is described in detail below. FIG. 1 is not drawn to scale, and relative positions of components may vary. For example, the electronic circuitry 130 may be disposed under the cupholder, around the cupholder as with a curved circuit board, or may be provided in a remote location connected via one or more cables.

In the implementation of FIG. 1, the source antennas 120 include coils of electrically conductive wire. However, each source antenna 120 may alternatively be formed of a single conductive strip, such as microstrip, or wire, may be formed in a straight line, in a loop, or as a coil as shown in FIG. 1. Alternatively, one or more of the source antennas 129 may be formed as an inductively- and/or capacitively-coupled group of conductive strips or wires disposed in electrically significant patterns (not shown). Each source antenna 120 may be formed as a discrete antenna as illustrated in FIG. 1, or may be printed on a rigid or flexible circuit board having one or more layers.

FIGS. 2A-2C illustrate wireless chargers having different shapes. In contrast to the wireless charger implementation shown in FIG. 1, which includes a cupholder 110 having a cylindrical shape, the diagrams of FIGS. 2A-2C, in general present variations of a disclosed wireless charger include two or more source antennas 220 disposed around a charging area having: a circular cross-section 223 as shown in FIG. 2A, an oval cross-section 224 as shown in FIG. 2B, or even a polygonal cross-section such as the rectangular cross-section 225 of FIG. 2C. Elements in FIGS. 2A-2C are numbered similarly to corresponding elements in FIG. 1. A charging area 223, 224, 225 may be a two- or three-dimensional space within a perimeter 226. Energy may be transferred wirelessly from the wireless charger to a wireless-power receiving device placed within the charging region, as discussed in more detail below. It will be recognized by those of skill in the art that a container, such as a cupholder, having a charging area may have an irregular perimeter, for instance including a notch for a coffee cup handle. However, the charging area may include or exclude areas of the corresponding container for which a pertinent portion of an electronic device would not likely enter. The source antennas 220 in some instances may roughly form the perimeter 226 of the charging area into which a wirelessly chargeable device may be placed for charging. The source antennas 220 in FIGS. 2A-2C are illustrated as being planar, perpendicular to the page. However, as shown in later figures, the antennas 220 may be formed in a non-planar shape, e.g., conforming to a curved, spherical, or other surface.

Figure 3:
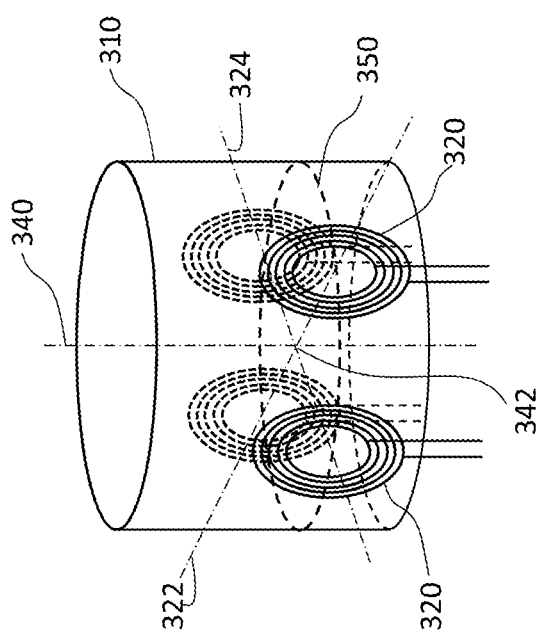
FIG. 3 is a top perspective view of a cupholder based wireless charger that implements four coil-type source antennas.

FIG. 3 is a top perspective view of a wireless charger that, for ease of illustration, implements only four, coil-type source antennas 320 of the same type as source antennas 120, 220 in earlier figures, within a cylindrical shape 310, such as the cupholder 110 of FIG. 1. The source antennas 320 are oriented to substantially face a central axis 340 of the cupholder 310 and may thus direct respective magnetic fields at least partially toward a charging area within the cupholder 310. The source antennas 320 forming the perimeter may be substantially identical to each other, or may include different antenna forms (not shown). For example, coil antennas may be mixed with non-coil conductive strips, for example, to address spacing issues or to provide additional field coverage. In some implementations a coil of a size for high efficiency power transfer may be too large to be accommodated in a first space. A conductive strip, such as microstrip, may instead be used in such space. If another portion of the wireless charger may accommodate a coil-shaped source antenna, that portion may include a coil-shaped source antenna in addition to, or instead of the conductive strip source antenna in the first space. For example, in some implementations of a mounting apparatus described below, a gripping portion may be insufficiently wide to accommodate a coil antenna, or the coil may not provide adequate coverage at some portions. Accordingly, a strip may be used in place of, or to supplement, a coil-shaped source antenna.

The antennas may be placed in spaced configurations (as in FIG. 3) or overlapping configurations (as in FIG. 1) and may form a two- or three-dimensional array. For example, the ring of source antennas 120 shown in FIG. 1 could be duplicated above and/or below the source antennas 120. The source antennas may be uniformly (or non-uniformly) angled upward such that one or more of the source antennas is parallel with a back surface of an electronic device when placed in a leaning orientation within the charging area. Specifically, when a mobile phone is placed in a cupholder of a vehicle, it typically leans against a top edge of the cupholder with the back of the phone being at an angle with respect to a side wall of the cupholder. In some circumstances, a source antenna intended to communicate power to a receiving antenna in the back of the phone may thus provide better alignment when angled similarly to the phone's power receiving antenna.

Further, in FIG. 3 the charging area perimeter formed by the coil-type source antennas 320 is circular. The illustrated source antennas have antenna axes 322, 324 that intersect at a point 342 within the perimeter. Those of skill in the art will recognize that an intersection of antenna axes may be offset above or below a plane 350 defined by centers of the conductive coils. Furthermore, it will be recognized that not all of the conductive coil axes need to intersect at the same point and that axes may in some implementations only approximately intersect, as the axes may be slightly offset. For example, while in some disclosed embodiments conductive coils or other source antennas may be activated in oppositely placed pairs, the optimal pair of source antennas for charging a particular device may not be diametrically opposite, depending on the size of the device to be charged, its receiving antenna orientation or format, and the like. In embodiments that employ multiple pairs of source antennas, such as the two pair of antennas 320 in FIG. 3, each pair may include a first antenna/coil disposed across the perimeter formed by the antennas/coils 320, approximately opposite a second coil of the pair of conductive coils. The orientation of a device to be charged may align with one pair of antennas/coils better than another pair. Circuitry may be employed to determine and select a pair of source antennas/coils 320 that best aligns with receiver coils of a portable electronic device (such as a phone case) placed within the charging area perimeter, and provide a changing electric current only to the selected pair of source antennas/coils 320.

Figure 4:
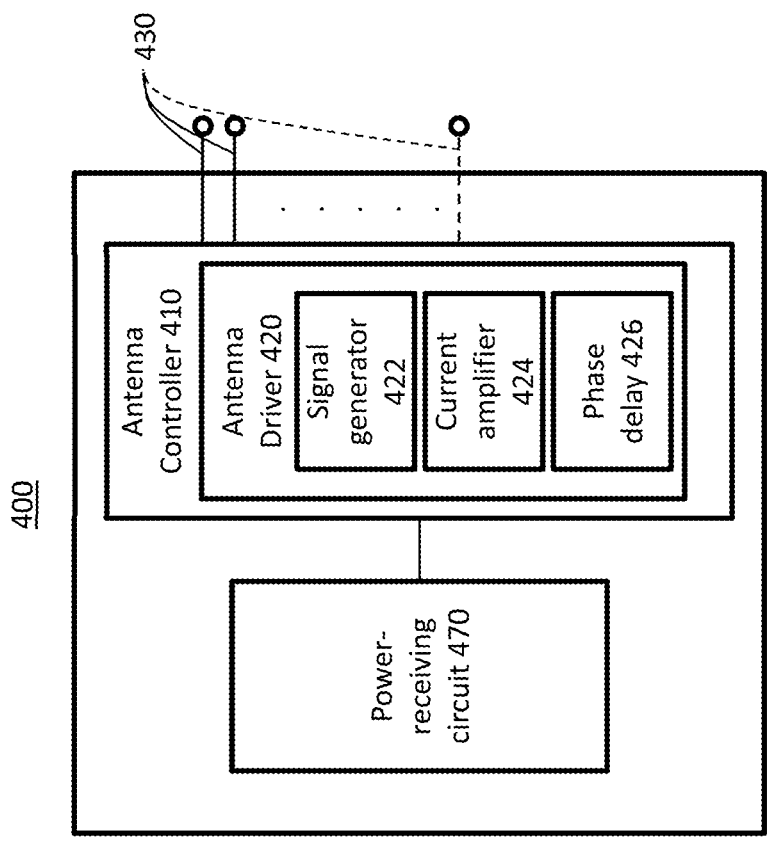
FIG. 4 is a block diagram illustrating elements of electronic circuitry in a wireless charger.

FIG. 4 is a block diagram illustrating electronic circuitry 400 of a wireless charger, corresponding to the electronic circuitry 130 in FIG. 1. The electronic circuitry includes an antenna controller 410 and a power receiving circuit 470. The antenna controller 410 may include at least one antenna driving circuit 420 to which a respective one or more source antennas, such as source antennas 120, 220, 320 may be connected via leads 430 from the source antennas. Antenna driver 420 may include a signal generator 422, such as an oscillator, that provides a current waveform. The waveform may be substantially sinusoidal, or may be a more complex waveform. The antenna driver 420 may further include a current amplifier 424 that amplifies the current waveform generated by the signal generator 422. The waveform produced by the antenna driver 420 may be predetermined, and the antenna driver 420 may in some embodiments produce the predetermined electric current waveform from a hard-configured arrangement of components or from a table of stored parameters for programmably configuring waveform-producing circuitry. In some embodiments the current amplifier 424 is adjustable depending on a feedback received from a device to be charged, such as a mobile phone, protective case, or other mobile device having wireless power-receiving circuitry. In some embodiments, the antenna driver 420 may further include phase delay circuitry or mechanisms 426 in order to provide a phase-delayed iteration of the current waveform generated by the signal generator 422. For example, use of multiple phase delay mechanisms or circuits may result in supply of 3-phase current to selected source antennas. Alternatively, a multi-phase inverter (not shown) may receive a single direct current (DC) voltage and provide a multi-phase changing current, such as 3-phase current, for application to source antennas.

Figure 5:
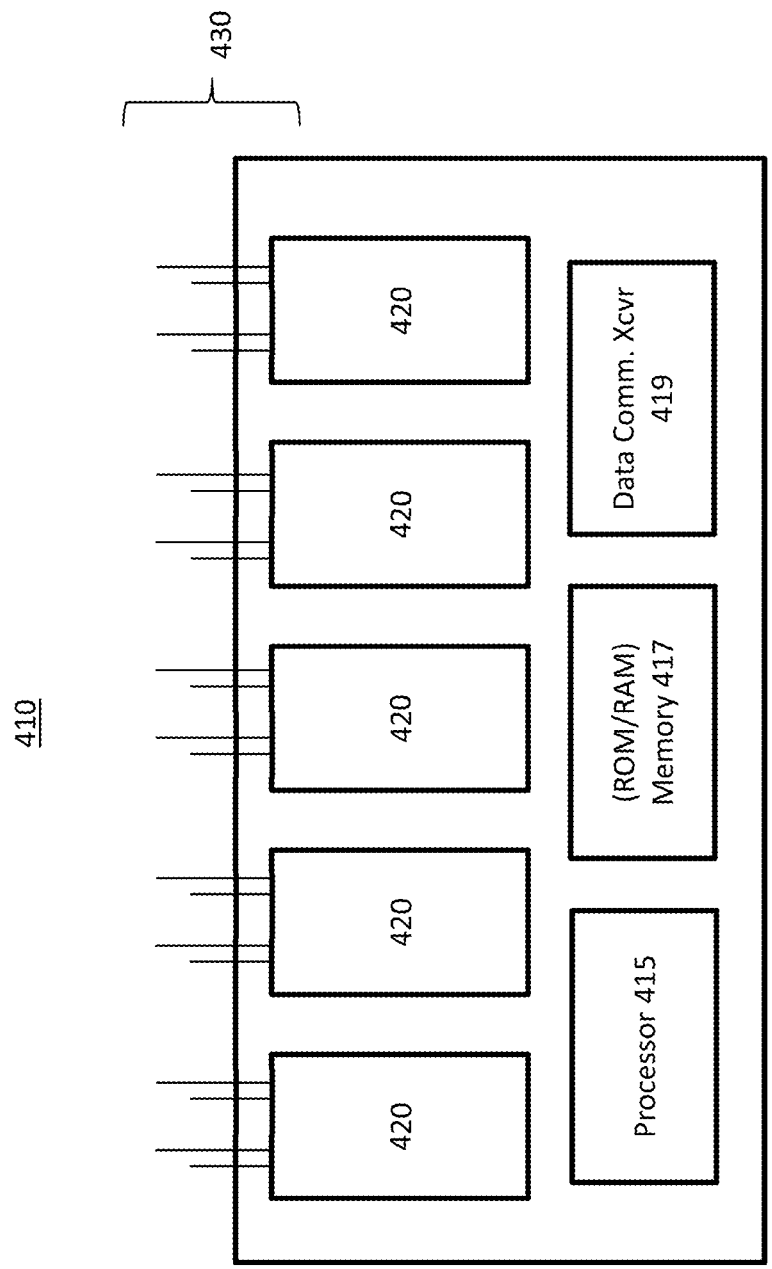
FIG. 5 is a block diagram illustrating an embodiment of electronic circuitry for a wireless charger.

Antenna controller circuit 410 may include a single antenna driver 420 that connects to all of the source antennas. Alternatively, groups of two or more source antennas may be connected to respective antenna driving circuits 420, or each source antenna may be connected to its own driving circuit. FIG. 5 illustrates a block-diagram example of an antenna control circuit, for example, that includes multiple antenna driving circuits 420, electrical leads 430, processor 415, memory 417, and data communication receiver or transceiver 419. The electrical leads 430 from pairs of antennas (not illustrated) are connected to respective antenna drivers 420. The processor 415 may manage and coordinate the functions of the antenna drivers 420 and may be associated with memory 417 that holds instructions to be executed by the processor 415.

The processor 415 may include one or more appropriately configured microprocessor or microcontroller circuits, digital processors, programmable logic arrays, programmable logic devices, state machines, discrete components or combinations thereof. The memory 417 may include one or more read only memory (ROM) and/or random access (RAM) memory, magnetic media such as a hard-disk drive, optical media and optical reader, flash memory, solid-state memory, and the like. The data communication receiver/transceiver 419 may in some embodiments receive and decode communications received from a device to be charged. In some implementations the data communication receiver/transceiver 419 may additionally provide communication to the device to be received as described in more detail below.

In embodiments having multiple source antennas, the multiple source antennas may be energized simultaneously with the same electrical current waveform at the same phase, or may be energized simultaneously by different phases of electrical current. For example, FIG. 6 illustrates three simultaneous phases 610, 612, 614 of a sine-wave electrical current, with each phase offset from the others by 120 degrees. Those having ordinary skill in the art will recognize that a time-varying electric current for generating a magnetic field need not be limited to a sinusoidal wave form, and need not be centered about a zero voltage as illustrated. The relative strength of a magnetic field generated at each of three groups of source antennas at any given time t in a wireless charging array may correspond proportionally to the electric current that energizes the corresponding source antenna(s) of the group, where each source antenna is energized according to a time-varying current waveform, such as a sinusoidal waveform. In the illustrated scenario, when one source antenna receives a maximum electrical current, another source antenna receives a lesser electrical current.

Each of the phases of electric current illustrated in FIG. 6 may be provided simultaneously to multiple antennas. FIG. 7 illustrates a top cross-sectional view of a wireless charger having six source antennas 720 dispersed around a circular charging area 723. The X and • notation for each of the energized source antennas 720 denotes a direction of current flow. In accord with the embodiment described above, each source antenna 720 of an opposing pair of source antennas 710 may receive the same phase of a current waveform, such as the sinusoidal waveform 610 of FIG. 6. In some embodiments, the remaining opposing pairs of source antennas may respectively receive the sinusoidal waveforms 612, 614 of FIG. 6.

In one aspect, different phases of the electrical current waveform may be simultaneously provided to permit all of the source antennas to be energized at the same time. This may reduce a surge of electrical current needed at any given moment, compared with providing the same phase to all source antennas at the same time. That is, if all source antennas received peak current at the same time, the circuitry needed to drive the source antennas would need to be selected for a higher total current than when only one source antenna, or sub-group of source antennas receives peak current at a given time. One advantage of this scenario may be the potential to provide wireless power to more than one device to be charged at a time without undue surges in current.

For example, one device to be charged (e.g., a first mobile phone) may be placed in the charging area of a wireless charger at a particular orientation that aligns receiving antennas, of the device to be charged, with a first set of source antennas. Another device to be charged (e.g., a second mobile phone) may also be placed in the charging area of the wireless charger at an orientation different from that of the first mobile phone, such that receiving antennas of the second mobile phone align with a second set of source antennas. Each of the mobile phones may receive power wirelessly from different sets of source coils with electric current waveforms having peaks that are offset from each other.

In one aspect, the provision of different phases of the electric current waveform to different sets of source antennas may be performed only to detect which of the source antennas or sets of source antennas most closely align with receiving coil(s) of a device to be charged. If all source antennas received the same current waveform at the same time, the magnetic field generated from neighboring source antennas may impede determination of which source antenna(s) best align with the receiving antenna(s) due to combining of magnetic fields.

Accordingly, an antenna controller, such as antenna control 410, may provide current to individual source antennas or sets of source antennas in a detection sequence. A data communication receiver or transceiver of the antenna controller circuitry, monitoring for a responsive communication at each source antenna. As described in more detail below, such responsive communication may include a value representing received power level. A highest received power levels among power levels received in correspondence to power supplied from each source antenna may indicate one or more most appropriate source antennas (generally the source antenna(s) most proximate to receiving antenna(s) of a device to be charged) for supplying power.

After determining a most appropriate source antenna or set of source antennas, the most appropriate antenna(s)—those determined from the detection sequence to be most closely aligned with receiving antennas of a device to be charged—may continue to be provided with an electric current waveform while the less appropriate source antennas (those for which a communication reply is not received or for which the communication reply indicates lower power received) may receive no electric current waveform or only an occasional electric current waveform provided for the purpose of ensuring that the most appropriate or most closely aligned source antenna(s) have not changed, e.g., due to shifting of the device to be charged. Those of ordinary skill in the art will acknowledge that more or fewer current waveform phases may be employed, and that even with a three-phase system the phases may be offset by other than 120 degrees.

However, in some embodiments magnetic fields from two or more source antennas may be strategically combined to target a specific portion of the charging area. For example, a source antenna controller may energize respective source antennas using multiple electrical current waveforms. The waveforms may be made complementary to each other for constructive aggregation, thus providing a stronger oscillating magnetic field at a target charging region among several possible or predetermined charging regions within the charging perimeter. More specifically, several magnetic fields may be additively combined to provide a highest magnetic field at a particular area. For example, when only one source antenna is energized with a time-varying electric current, the magnetic field may be strongest in a particular area near the source antenna. In a coil-shaped antenna, the magnetic field is typically strongest along an axis passing through the center of the coil. However, if two adjacent coils are simultaneously energized with the same time-varying electric current, the location of the strongest magnetic field may be between the central axes of the two coils because the magnetic fields may combine. The magnitudes and phases of magnetic fields generated at each source antenna may thus be coordinated to "steer" an aggregate magnetic field for best charging to any of several possible or predetermined charging regions. The magnetic fields may in this respect, and/or otherwise be complementarily aggregated. Accordingly, a device to be charged, such as a mobile phone, may be placed within a charging area according to any of several orientations corresponding to a charging region and still be able to effectively engage the source antennas.

At certain frequencies of oscillation, an electromagnetic field may induce an electrical current in certain conductive objects in addition to receiving coils. Inherent resistance in some of these objects can cause them to heat up in response to the induced current. For example, as little as 500 mW of power can result in a coin heating to 80+ degrees Celsius—hot enough to melt plastic or burn skin. Thus, for safety and efficiency in disclosed embodiments, electric current may not be provided to the source antennas at all times. For example, the wireless charger may include a foreign object detection circuit that can turn off the charger (cease providing current to the source antenna(s)) when certain types of foreign object are detected. Established mechanisms for such detection include a loss monitoring scheme, where the power received at a device to be charged (e.g., receiving antenna(s)) is compared with power provided by source antennas, taking into consideration losses inherent in the system; if the losses are greater than expected, the charger may not provide current to the source antenna corresponding to the unexpected power loss.

Embodiments of a wireless charger according to the present disclosure may alternatively include a per-source antenna control or a whole system control. The per-source control may detect losses for each source antenna individually and thence control the current provided to each source antenna according to whether or not unexpected power losses correspond to that source antenna. In a whole-system control implementation, an unexpected power loss between any source antenna and a receiving antenna may result in the entire wireless charger being at least temporarily disabled.

In some embodiments, loss monitoring may be implemented using a loss detection circuitry constituting a detection unit. The detection unit may include data communication circuitry and a processing circuit, such as a comparator or processor, that may calculate losses based on information received from a device to be charged that has a receiving antenna.

A device to be charged may include communications circuitry for communicating with an antenna controller described above and/or detection unit of the wireless charger via one or more of several communication means. Some disclosed embodiments may employ modulation of the coupled electromagnetic field used for power transfer. For example, circuitry associated with a receiving antenna may selectively modulate a load, thus affecting the amplitude of the induced magnetic field. This modulation may be decoded at the antenna controller of the power source as feedback indicating the power levels needed, power levels received, etc. In other embodiments, data communication between the source and receiving devices may include other wireless communication circuitry and protocols, including but not limited to WI-FI, BLUETOOTH, BLUETOOTH SMART (also called BLUETOOTH low energy), ZIGBEE, or the like.

The data received by the detection unit may include any of at least: the amount of power received at the receiving antenna of the device to be charged, a difference between power received and power expected, and/or expected losses at the receiving antenna. The processing unit or processor may use the received information to calculate losses and compare with expected losses. Alternatively, the processing unit or processor of the detection unit may simply compare the received information with expected values. If the results of the calculation and/or comparison indicate the presence of a foreign object in addition to the device to be charged, the detection unit may prevent supplying current to the source coil that corresponds to the power losses indicating a foreign object or damage to the coil or related circuitry. In some implementations, the detection unit may use predetermined threshold ranges for values of expected losses and/or power received at the device to be charged. For example, a first threshold range may include maximum and minimum values between which the actual loss or received amount of power indicate the presence of a foreign object, and a second threshold range may include maximum and minimum values between which the actual power loss or received amount of power are expected. The threshold ranges may be predetermined and included in a look-up table or may be regularly calculated anew, e.g., at device power up.

The detector may also include circuitry such as a processor or discrete components programmed or arranged to determine which source antenna or antennas best correspond to receiving antennas of a device to be charged. The determination of best-corresponding source antenna(s) may be performed periodically. The determination of best-corresponding source antenna(s) may include causing the source antenna controller to provide an amount of current to each source antenna, or selected subsets of the source antennas, in a predetermined sequence and receiving a communication from the device to be charged in response to each electrical current induced at the device to be charged, in which communication the device to be charged may report the strength of the induced current. The source antenna(s) corresponding to the best (e.g., highest) induced current may be controlled to provide wireless charging to the device to be charged, while remaining source antenna(s) may be disabled until another of the periodic determinations of best-corresponding source antenna(s). Using these techniques, the wireless charger is able to automatically configure or reconfigure itself to increase the amount of charging current delivered to a device placed in the charger even though the device may be oriented differently each time it is placed in the charger.

When a device to be charged is removed from the charging region, the next determination of best-corresponding source antenna(s) may receive no communication in response to electromagnetic fields generated at any source antenna, and the source antenna controller may thus rest dormant until the next periodic determination of best-corresponding source antenna(s).

In disclosed embodiments of the wireless charger, a power receiving circuit, such as power receiving circuit 134 in FIG. 1, may receive power from an external source, such as a vehicle's accessory socket, or from a direct or fused connection to a vehicle's main battery. Connection to a power source external to the wireless charger may be provided as part of an original vehicle manufacture or as an after-market addition. It is recognized that the presently disclosed wireless charger features may be applied in a variety of portable electronic device holders that may or may not naturally orient the portable electronic device to align source and receiving antennas. For example, although a cupholder-shaped charger is described above, the wireless charger features are not limited to a cupholder or to a vehicle. It is acknowledged, however, that a cupholder or other non-orienting holder format for wireless charging may also be useful in certain non-vehicle settings. For example, a fully or partially cup-shaped holder may be useful in an office setting as a convenient phone holder, where a user can simply place the phone in the holder without thought to orientation.

The exemplary wireless charger embodiments disclosed herein may alternatively receive power from an alternating current (AC) home circuit using an appropriate power converter that may be part of an external circuit (e.g., a "wall-wart", or transformer) or using internal circuitry of the wireless charger appropriate for conversion of AC power. The power receiving circuit of the wireless charger may perform one or more of power conversion from a higher or lower DC voltage to a voltage usable by circuitry of the wireless charger. For example, a DC converter may receive 6 volt, 12 volt, or 24 volt DC power from a vehicle battery and convert it to 5 volt DC power or another lower voltage for use by other circuitry of the wireless charger. The power receiving circuitry may further condition the input power by regulating, rectifying, stabilizing, and/or otherwise preparing the input power for best use by the wireless charger circuitry.

Source antennas of a wireless charger may produce electromagnetic fields that could in certain situations affect surrounding circuits, including vehicle electronics, pacemakers, etc. Accordingly, a housing of the wireless charger, such as a vehicle cupholder, may include electromagnetic shielding placed to limit the area affected by the electromagnetic fields. For example, a cupholder implementing a disclosed wireless charger may include shielding around the sides and on the bottom of the cupholder. In some embodiments the cupholder may also include selectively removable electromagnetic shielding over its top.

The source antennas may be placed internally to, externally to, or between walls of a device holder such as the cupholder shape described above. Electromagnetic shielding may be implemented to eliminate or reduce the external effects of electromagnetic fields generated by the wireless charger. In one example, the wireless charger may be provided as an after-market product available for user installation in a vehicle cupholder. In this embodiment a user may obtain a wireless charger, for example in a wireless charger kit, and install an array of source coils and accompanying circuitry of the wireless charger in an existing cupholder. A power cord may be provided in the kit, or obtained separately, permitting connection between the power receiving circuitry and an external power source. For example, a cable may be provided having a standard connector, such as a micro USB connector, at one end, and a 12-volt accessory plug at the other end.

In another implementation, a wireless charger installation may include accessing a back/bottom side of an existing cupholder or other cavity during vehicle assembly or later, after disassembly of a console or other region having a cavity suitable for wireless charging. In the instance of using a cupholder for the wireless charging area, the wireless charger may be installed around an interior portion of the cupholder, thus hiding the coil array from sight. A connection to vehicle power may be wired directly to a fuse box or other vehicle power access point.

Embodiments of the wireless charger for use in a vehicle may include communication circuitry for communicating with a vehicle's information systems in order to provide information regarding charging and the like. In one non-limiting example, the wireless charger may include fuel gauge circuitry configured to calculate a charge level and time to charge for a battery located in the device to be charged. The communication circuitry for communicating with the vehicle's information systems may provide the charge level or charging time information to the vehicle's information systems for convenient display to the driver via an in-dash indicator, information screen or the like. In installations where wireless chargers are associated with specific seats of the vehicle, various indicators, such as information screens, LEDs, or the like may notify the corresponding seat occupant of the charging information.

A conventional device to be charged may include only a single wireless power receiving antenna disposed at the rear plane of the device. This arrangement permits proximity to the source antenna of a planar charging device (e.g., a charging mat) when the device is laid down directly on the surface of the planar charging device. However, when such a device is placed within a charging area of the wireless charger disclosed herein the planar receiving antenna may be insufficiently proximate to a source antenna. In a specific example, a cupholder-based charger described above includes a ring of conductive coils disposed around a cylindrical wall of a cupholder. The cylindrical wall may have a round or oval cross section and may have a uniform or varying thickness. For example, the cylinder wall may be made thinner where it corresponds to a source antenna and comparatively thicker elsewhere, e.g., for structural strength. The cylinder wall may have ribs or other structural features to increase its structural integrity, and may include, at an inside surface of the cylinder wall, one or more protrusions for engaging a cup and/or for securely holding or orienting a device to be charged. Indeed, in some embodiments, some or all of the source antennas may be formed or embedded within the cylinder wall. When a conventional device to be charged is placed in the cupholder, the mobile phone may lean against the top rim of the cupholder at an angle such that the conventional device's single receiving coil is angled away from a source coil of the wireless charger, thereby preventing electromagnetic coupling or at least reducing the strength of the coupling and related charging efficiency. That is, an inductive coil conventionally placed at the back of the phone may, when used with the above-disclosed three-dimensional wireless charger, be sufficiently distant from a source coil that wireless charging would be inefficient and slow, if even possible. There are at least two ways to address this problem.

In one solution, the source antennas themselves may be angled to better accommodate a leaning electronic device. For example, a cupholder-based wireless charger may be formed having a beveled surface corresponding to source antennas such that a conventional device to be charged would contact or more-proximately align with a source antenna.

Alternatively, as disclosed herein, the device to be charged may include receiving antennas disposed at the sides of the device. Such placement of plural receiving antennas may permit much closer proximity between source and receiving antennas, despite variety of device size, as shown in FIGS. 8A to 8C and 9.

FIG. 8A illustrates a protective case 800 having a rigid external shell 810 and various electronic circuitry related at least to the wireless power transfer. It will be recognized that elements of FIGS. 8A-8C may also apply to embodiments of a mobile electronic device itself, such as a mobile phone. The rigid shell 810 includes at least side walls 812, a bottom wall 814 and a substantially planar back portion 816 from which the side walls 812 and bottom wall 814 extend. The back portion 816 of the rigid shell 810 may receive the back of a mobile phone or other portable electronic device. It will be appreciated that the back portion of the rigid shell may be formed to accommodate phone geometries that are not substantially planar, such as curved back. In some embodiments the rigid shell may further include a top wall that extends from the back portion.

Embodiments may further include a face portion that joins the side, bottom, and/or top walls and defines an aperture permitting access to an interactive control of an encased mobile phone or other portable electronic device. It will be appreciated that some or all of the side, bottom or top walls may extend from the face portion rather than from the back portion, or that each of the back and face portions includes a portion of some or all of the walls. For example, in an embodiment the side and bottom walls 812, 814 may extend from the substantially planar back portion 816 in a first shell portion, whereas the top wall and front portion may constitute a second shell portion. Other combinations will be acknowledged by those having ordinary skill.

Different charging standards may require different antenna characteristics and placements. FIG. 8B shows a side cutaway view of a protective case 800, where a portion of the outermost shell 810 of the protective case has been cut away to expose a side-disposed receiving antenna 830 and receiving antenna leads 835. A second receiving antenna (not shown in this view) may be similarly disposed on the opposite side of the protective case 800. The receiving antenna leads 835 connect each receiving antenna to power receiving circuitry 840 (described in detail below with respect to FIG. 9). Although the power receiving circuitry 840 is illustrated here as being at a back, bottom portion within the protective case, the charging circuitry could be located in a side, top, or anywhere along the back within enclosed walls of the protective case 800. Power receiving circuitry 840 may be placed to avoid interference with communications of an enclosed electronic device, to minimize the size of the protective case 800, and/or to minimize length of the receiving antenna leads 835.

FIG. 8C shows a cutaway rear perspective view of the protective enclosure 800 where a portion of the outermost shell 810 is removed to expose power receiving circuitry 840. Although the figures show a coil-type antenna, the receiving antenna may include other forms of antenna, such as a strip (or microstrip) antenna at each side edge. FIG. 8C further illustrates that a protective case according to the disclosure may include a battery 850, such as a rechargeable battery. The power receiving circuitry 840 may receive a time-varying current induced by a magnetic field in at least one of the receiving antennas 830 and convert the time-varying current to a direct current for use by an electronic device encased by the protective enclosure and/or for charging the battery 850 via a battery charging circuit (not shown).

The term "battery" herein may be shorthand for "electrical power storage device", and may include any of a variety of electrical power storage means. For example, battery 850 may include one or more rechargeable cells having any of various chemistries, such as lithium-ion, lithium polymer, lead-acid, nickel cadmium, and the like. The battery may alternatively or additionally include a capacitive storage element, such as a so-called super-capacitor. In one example, a conventional rechargeable battery may be combined with a super-capacitor such that the super-capacitor may reduce transient current spikes to or from the battery, thus enhancing the life and efficiency of the battery. In another alternative a super-capacitor may comprise the entire energy storage means, and may be configured to receive a large amount of current in a short period of time. Still further, the battery 850 may comprise a fuel cell, where power received from a wireless charger may be used to electrolyze a stored reactant to produce, e.g., hydrogen, for consumption by the fuel cell.

The side walls 812 of the rigid shell may each include a receiving antenna formed from a strip or wire of conductive material. The receiving antenna 830 may be a single line, a loop, or a coil of strip or wire, and at least one portion of each receiving antenna 830 is connected to power receiving circuitry 840, such as power-receiving circuitry. The receiving antennas 830 may be positioned to align with source antennas of the above-described wireless charger when placed within the perimeter area of the wireless charger, and particularly when each of the receiving antennas is aligned with a corresponding source antenna.

Figure 9:
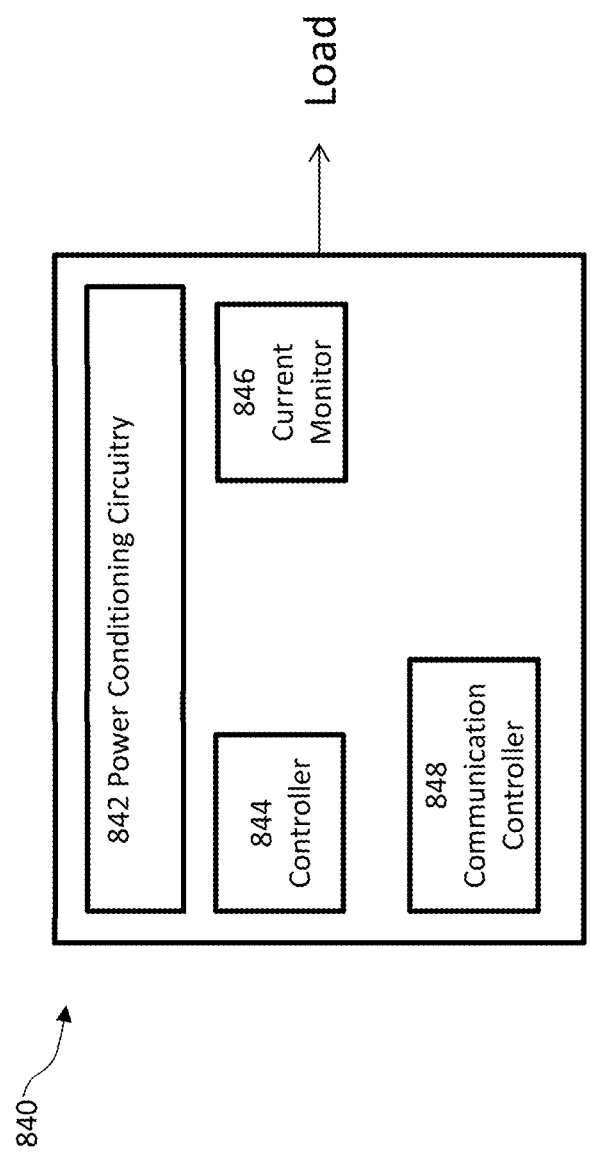
FIG. 9 shows a block diagram of power receiving circuitry for a device to be charged by wireless power transfer.

FIG. 9 shows a block diagram of one example of power receiving circuitry 840, which may include power conditioning circuitry 842, such as hardware components or integrated circuits connected or programmed to condition current(s) induced in the receiver coils 830 by a time-varying magnetic field. The power conditioning performed by the power receiving circuitry may include AC to DC current conversion, DC to DC current conversion, current rectification, and/or voltage regulation, and the like. Accordingly, the power conditioning circuitry 842 may include a power inverter, a power converter, a current rectifier, and/or a voltage regulator. Power receiving circuitry 840 may further include a power conditioning controller 844 having components such as discrete circuitry, or a processor, that monitors and controls the power conditioning circuitry 842 and/or that controls provision of the conditioned power to a load (not shown). The load may include a battery of the protective enclosure and/or may include a battery or other circuitry of an enclosed portable electronic device.

The power receiving circuitry 840 may include a current monitor 846 that monitors current drawn by the load. Power receiving circuitry 840 may also include a data communication controller 848 that transmits information to a disclosed wireless charger, reporting information provided by the power receiving circuitry 840. The communication of data between power receiving circuitry 840 and a wireless charger may include power carrier modulation. In power carrier modulation a resistive or capacitive load internal to the power receiving circuitry is modulated, the internal load being independent from the system load (e.g., the battery or device to be charged). The magnetic field is encoded with a data signal via the modulation of this internal load, which directly affects the induced current and thus the magnetic field.

Circuitry at the source antennas detects the changes in the magnetic field demodulate and decodes the data signal. The data signal may include received-power signal strength, control error information, a command to stop power transfer. Alternative to the internal load modulation, the data communication controller 848 may use wireless communication means such as BLUETOOTH low energy, WI-FI, ZIGBEE or the like to communicate with complementary communication circuitry of the wireless charger. In some implementations, the power receiving circuitry 840 may be configured to use one or more of the above communication methods using one or more of a plurality of wireless power transfer standards or implementations. That is, communication circuitry of a disclosed device to be charged may permit communication according to a detected wireless charger standard. If the device to be charged detects that a wireless charger complies with a QI standard, the device to be charged may respond accordingly using load modulation, whereas if the device to be charged detects that a wireless charger complies with an A4WP standard, the device to be charge may respond by communicating via a BLUETOOTH transmission.

For example, FIG. 10A illustrates a top view of a protective case 1000 (or mobile electronic device) as it may appear from the top when disclosed within a circular cupholder 1010 having a wireless charger disclosed herein. For simplicity, only four source antennas 1020 are illustrated; however, more or fewer source antennas may be included as described above. In the illustrated orientation, receiving antennas 1030 of the protective case 1000 are proximate two of the source antennas 1020 of the wireless charger when the protective case 1000 is placed within a charging area of the wireless charger 1010. FIG. 10B illustrates the same top perspective view of the protective case 1000 (or mobile electronic device) except that the source antennas 1020 are shown in cross-section and electromagnetic field lines are illustrated for each of the proximate source antennas 1020.

The X and • notation for each of the two energized source antennas 1020 denotes a direction of current flow. A magnetic field generated by the current flow through the source antennas is represented by magnetic field lines using standard field-strength notation. The magnetic field is generated according to a "right-hand rule" in which if a person's outstretched right thumb represents the direction of current flow, the curled right-hand fingers represent the direction of magnetic flux (flow). In the instance of a conductive coil, the magnetic flux lines are naturally more dense at a central axis of the coil, indicating a stronger magnetic field at the axis. It can readily be seen in FIG. 10B that the energized source antennas 1020 provide an electromagnetic field, which may interact with (and induce current in) proximately disposed, side-positioned receiving antennas 1030 of the protective case 1000. Furthermore, it will be appreciated by those of skill in the art that the receiving antennas 1030 may be energized even without a precise alignment when charging techniques disclosed herein are implemented.

Figure 11:
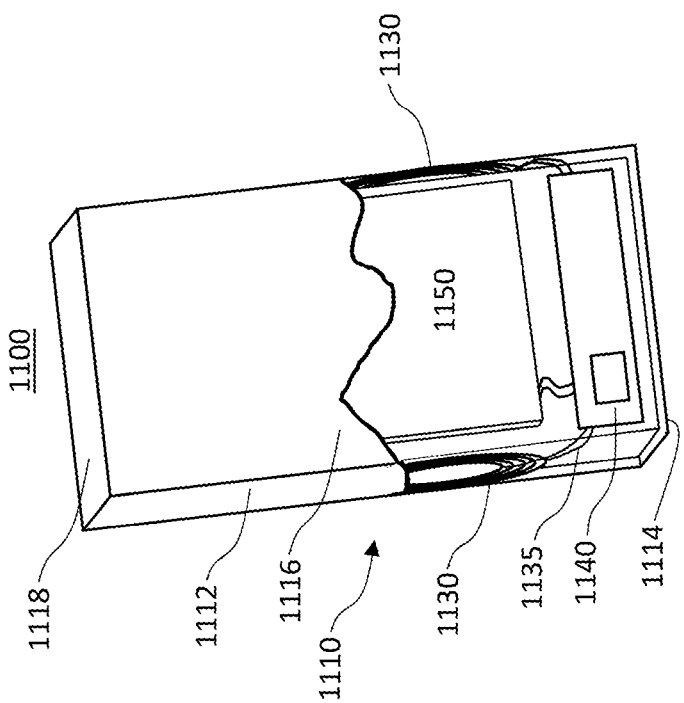
FIG. 11 illustrates a device to be charged that includes a rechargeable battery disposed within walls of the device to be charged.

FIG. 11 illustrates a protective enclosure 1100 that includes a rechargeable battery 1150 disposed within walls of the protective enclosure. The protective enclosure 1100 may include a shell 1110 that has at least side walls 1112, a bottom wall 1114, and a substantially planar back portion 1116. Some implementations of the protective enclosure may also include a top wall 1118 and a front portion (not shown in FIG. 11). Power receiving circuitry 1140 may reside on a circuit board and, as described above with respect to other embodiments, may receive power via receiving antennas 1130. The power receiving circuitry 1140 may provide the received power directly or indirectly to battery 1150 or to an internal connector of the protective enclosure 1100, where the internal connector provides a connection to a complementary connector of a portable electronic device that is encased by at least part of the protective enclosure. The battery 1150 of the protective enclosure 1100 may be used for recharging a battery of the portable electronic device, or for directly powering the portable electronic device. For example, the power receiving circuitry 1140 may transfer power from the battery 1150 to an encased portable electronic device. Power receiving circuitry 1140 may be disposed or programmed to transfer the power from the batter to the portable electronic device whether or not simultaneously receiving wireless power transfer through the receiving antennas 1130.

Figure 12:
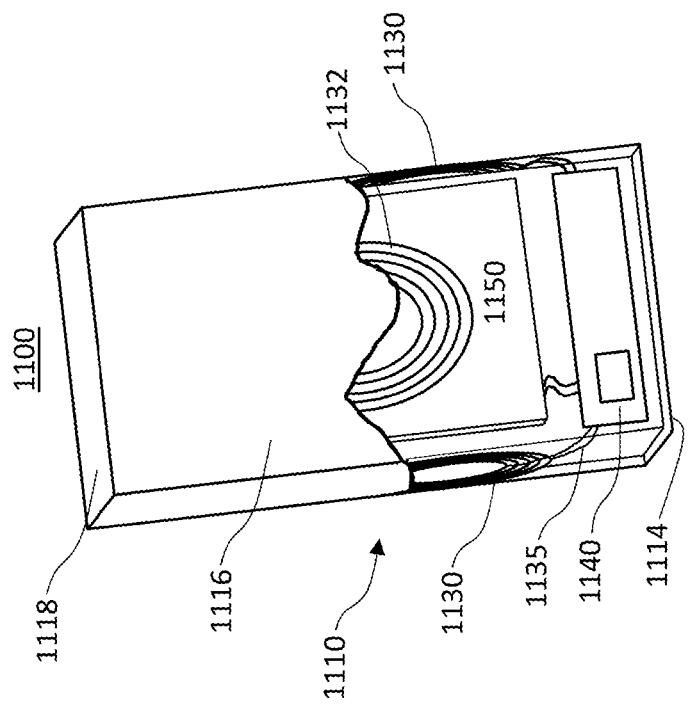
FIG. 12 shows the device to be charged as in FIG. 11, with the addition of a rear-disposed receiving antenna.

A protective enclosure such as protective enclosures 800, 1100, may include receiving antennas, such as inductive coils, in areas other than the sides of the enclosure. For example, as illustrated in FIG. 12, protective enclosure 1100 may additionally include at least one rear-disposed receiving antenna 1132 disposed within the planar back portion 1116, thus providing means for receiving wireless power on at least three sides of the protective enclosure. Furthermore, a receiving antenna so disposed at the back of the case may permit the protective enclosure 1100, and/or an encased portable electronic device, to receive wireless power when laid on a conventional planar wireless charger. In another alternative, the protective enclosure 1100 may include a bottom- or top-disposed receiving antenna (not illustrated) placed within the bottom wall 1114 or a top wall of the protective enclosure 1100.

It will be appreciated that the term "protective" in the title "protective enclosure" is used primarily as an identifier. The enclosure may provide little, if any, protection from drops, impacts, scratches, water, dust, chemicals, and the like. Alternatively, the protective enclosure may be constructed to provide significant, even robust protection against drops, scratches, chemical or biological exposure, dust, and/or water, etc. For example, a protective enclosure according to disclosed embodiments may be waterproof, providing protection from water and submersion up to IP 68 standards or beyond. The principles of inductive coupling can function underwater. Accordingly, a protective enclosure or case having features disclosed herein may wirelessly receive a power charge from a power source while underwater and/or from an underwater wireless power source.

Figure 13:
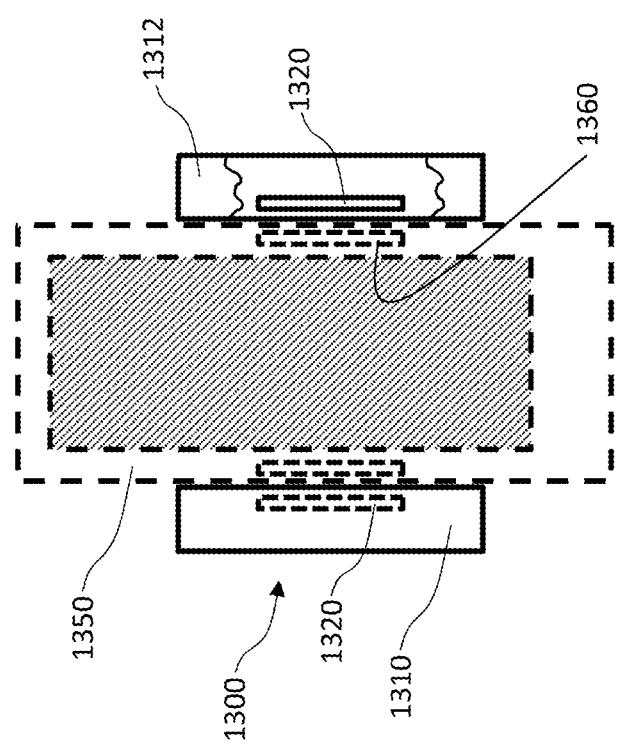
FIG. 13 is a partial cutaway view of part of a mounting apparatus for a portable electronic device or protective enclosure and having wireless power receiving antennas.

FIG. 13 shows part of a mounting apparatus 1300 for a portable electronic device or protective enclosure 1350. The mounting apparatus 1300 may include a gripping device including a first side engaging portion 1310 and a second side engaging portion 1312 that, together, hold sides of an uncased portable electronic device or of a protective enclosure 1350 (with or without a portable electronic device inside). At least one of the side engaging portions 1310, 1312 may include an extension-length adjustment mechanism (not shown) that may be manipulated to change a distance between the first side engagement portion 1310 and the second side engaging portion 1312. For example, one or both of the side engaging portions 1310, 1312 may be extended and retracted to squeeze a device held by the side engaging portions. The mounting apparatus 1300 may include a wireless charger. In addition to charging circuitry as disclosed above, the wireless charger of the mounting apparatus 1300 may include laterally disposed source antennas 1320. The side engaging portions 1310 at each side may each include a source antenna 1320 disposed to correspond with side-disposed receiving antennas 1360 of the portable electronic device or protective enclosure 1350, such as those described above.

In addition a planar portion of the mounting apparatus 1300 may be disposed to receive a corresponding back portion of a portable electronic device, such as a device to be charged. The planar portion may include a source antenna in addition to the source antennas 1320 disposed in the side engaging portions 1310, 1312. Depending on the configuration of a device to be charged placed on the mounting apparatus 1300, a source antenna disposed in the planar portion of the mounting apparatus 1300 may be energized simultaneously with source antennas 1320 or separately. For example, a mobile phone or protective case having only a conventional rear-facing receiving antenna for wireless power transfer may receive wireless power from the source antenna disposed in the planar portion of the mounting apparatus. However, a device to be charged that has two or three receiving antennas may receive wireless power transferred from all three source antennas of a mounting apparatus 1300 having three source antennas. Electronic circuitry of the wireless charger described above may similarly be included with the mounting apparatus, with the limitation that the mounting apparatus would have a standard mounting position for the device or enclosure, thus limiting the need for initiation sequences and detection of a best source coil for providing wireless power.

Figure 14:
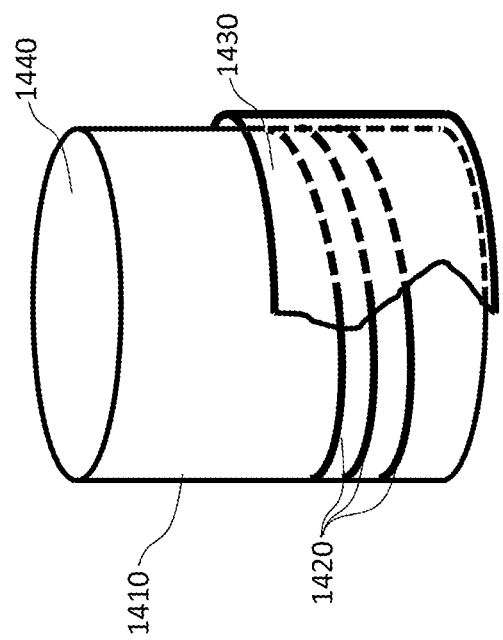
FIG. 14 shows an alternative embodiment of a wireless charger in which a cup-shaped structure is surrounded by one or more loops of electrically conductive material and an electromagnetically insulated material.

FIG. 14 shows an alternative embodiment of a wireless charger in which a cup-shaped structure 1410 may be surrounded by one or more loops 1420 of electrically conductive material such as metal wire. The loops 1420 in turn may be surrounded by a shielding material 1430, shown partially cut away in FIG. 14, having properties or structure and/or material that prevents or reduces passage of magnetic and electric fields. The shielding material may be further disposed at a bottom of the cup structure. Accordingly, electromagnetic fields generated at the electrically conductive loops 1420 may largely be confined to within the cup-shaped structure 1410. The shielding material 1430 may be further disposed around a top opening 1440 of the cup-shaped structure. The electrically conductive loops 1420 may be tuned to a resonant frequency of the loops. The resonant frequency may be the same as a resonant frequency of one or more receiving coils of a portable electronic device or protective enclosure that may be placed in the cup structure 1410. When the electrically conductive loops 1420 are energized with a changing current at the resonant frequency, a magnetic field may be generated within the cup-structure and having a peak amplitude at a central axis of the cup-shaped structure.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless charging apparatus for charging a battery of a portable electronic device, the wireless charging apparatus comprising;
   a plurality of electrically conductive coils, the conductive coils each forming a portion of a perimeter around a receiving area configured to receive the portable electronic device, each conductive coil having a central axis around which the respective conductive coil is formed, the central axis of each conductive coil directed inward from the perimeter, each conductive coil in the plurality of conductive coils including at least one loop of electrically conductive material, the ends of each conductive coil constituting electrical leads; and
   electronic circuitry, comprising:
      an electric power receiving circuit configured to receive electrical power and to provide at least a portion of the electrical power to a coil controller, and
      the coil controller, electrically connected to the electric power receiving circuit and to the electrical leads of the conductive coils, the controller configured to selectively provide a changing electric current to at least one of the conductive coils, the changing electric current inducing a magnetic field around the respective conductive coil selected for receiving the changing electrical current.

2. The wireless charging apparatus according to claim 1, wherein the coil controller provides the changing electric current simultaneously to at least two of the conductive coils.

3. The wireless charging apparatus according to claim 2, wherein the coil controller is further configured to provide the changing electric current to each of the at least two conductive coils using a predetermined electric current waveform.

4. The wireless charging apparatus according to claim 3, wherein the coil controller is configured to provide the predetermined electric current waveform to each of the at least two conductive coils at a different phase of the waveform such that at any given time the current at one of the at least two conductive coils has a different amplitude compared with the current provided to another of the at least two conductive coils.

5. The wireless charging apparatus according to claim 4, wherein the predetermined electric current waveform is a sine wave.

6. The wireless charging apparatus according to claim 5, wherein the at least two conductive coils comprises three or more conductive coils, and the coil controller simultaneously provides the predetermined electric current waveform at three different phases of the sine wave, each phase being separated from the other two phases of the three different phases by about 120 degrees and being applied respectively to the three or more conductive coils.

7. The wireless charging apparatus according to claim 2, further comprising at least one target charging region within the receiving area, wherein the coil controller is configured to provide the changing electric current to each of the at least two conductive coils at respective magnitudes and phases of the electric current that induce complementary magnetic fields, the complementary magnetic fields combining to provide an aggregate oscillating magnetic field at the target charging region.

8. The wireless charging apparatus according to claim 2, further comprising a detection unit of the electronic circuitry, wherein,
the coil controller is further configured to perform a detection sequence at least once after receiving power from the power receiving circuit, the detection sequence including at least provision of the changing electric current temporarily to each of the conductive coils in a predetermined order, and
the detection unit includes:
a data communication receiver configured to receive, for each conductive coil, a communication from the portable electronic device reporting an amount of power received at the portable electronic device, and
a processing circuit configured to compare each reported amount of power received to a predetermined power amount value and, based on the reported amounts of power received, to determine at least one of the conductive coils to which the coil controller shall supply the changing electrical current.

9. The wireless charging apparatus according to claim 8, wherein the processing circuit of the detection unit is further configured to determine the at least one of the conductive coils to which the coil controller shall supply the changing electrical current by calculating whether any reported amount of power received is within one of a first predetermined threshold range or a second predetermined threshold range, wherein
the detection unit is further configured to:
if the reported amount of power received is within the first predetermined threshold range, prevent further provision of power to the corresponding conductive coil, and
if the reported amount of power received is within the second predetermined threshold range, initiate transmission of power to the corresponding conductive coil.

10. The wireless charging apparatus according to claim 1, wherein the plurality of conductive coils includes one or more pairs of the conductive coils, and the coil controller is further configured to provide the changing electrical current to a selectable one pair of the one or more pairs of conductive coils, each pair of conductive coils having a first coil disposed across the perimeter approximately opposite a second coil of the pair of coils, each pair of conductive coils positioned to be respectively proximate a corresponding pair of receiver coils of the portable electronic device when the portable electronic device is disposed in the receiving area in alignment with the selected one of the one or more pair of coils.

11. The wireless charging apparatus according to claim 1, wherein the conductive coils are disposed edge-adjacent each other, one side portion of each conductive coil being proximate an opposite-side portion of a first adjacent conductive coil and the other side of said each conductive coil being proximate an opposite-side portion of a second adjacent conductive coil.

12. A cupholder of a vehicle, comprising a substantially cylindrical wall having an open top and a closed bottom, the cylindrical wall compassed by the wireless charging apparatus according to claim 1, the perimeter of the wireless charging apparatus disposed around the cylindrical wall between the open end of the cylindrical wall and the closed bottom of the cylindrical wall.

* * * * *